US012671619B2

(12) United States Patent
Meng et al.

(10) Patent No.: US 12,671,619 B2
(45) Date of Patent: Jun. 30, 2026

(54) MODULATION METHOD, DEMODULATION METHOD, AND COMMUNICATION APPARATUS

(71) Applicants: HUAWEI TECHNOLOGIES CO., LTD., Shenzhen (CN); Academy of Mathematics and Systems Science of the Chinese Academy of Sciences, Beijing (CN)

(72) Inventors: Xianhao Meng, Shenzhen (CN); Xianbin Wang, Hangzhou (CN); Yongtang Shi, Beijing (CN); Guiying Yan, Beijing (CN); Zhiming Ma, Beijing (CN)

(73) Assignees: Huawei Technologies Co., Ltd., Shenzhen (CN); Academy of Mathematics and Systems Science of the Chinese Academy of Sciences, Beijing (CN)

( * ) Notice: Subject to any disclaimer, the term of this patent is extended or adjusted under 35 U.S.C. 154(b) by 299 days.

(21) Appl. No.: 18/486,763

(22) Filed: Oct. 13, 2023

(65) Prior Publication Data

US 2024/0039777 A1 Feb. 1, 2024

Related U.S. Application Data

(63) Continuation of application No. PCT/CN2022/085635, filed on Apr. 7, 2022.

(30) Foreign Application Priority Data

Apr. 16, 2021 (CN) .......................... 202110414085.8
Jun. 17, 2021 (CN) .......................... 202110669959.4

(51) Int. Cl.
H04L 27/36 (2006.01)
H04L 27/38 (2006.01)

(52) U.S. Cl.
CPC ........... *H04L 27/366* (2013.01); *H04L 27/38* (2013.01)

(58) Field of Classification Search
CPC ... H04L 1/0041; H04L 1/0045; H04L 1/0058; H04L 1/0067; H04L 1/0071; H04L 27/36;
(Continued)

(56) References Cited

U.S. PATENT DOCUMENTS

2012/0057647 A1* 3/2012 Chen .................... H04L 1/1671
375/295
2015/0091742 A1 4/2015 Ionita et al.
(Continued)

FOREIGN PATENT DOCUMENTS

CN 109194443 A 1/2019
WO 2019197037 A1 10/2019

OTHER PUBLICATIONS

English translation of International Search Report for PCT/CN2022/085635 mailed Jun. 22, 2022 (Year: 2022).*
(Continued)

*Primary Examiner* — Benjamin H Elliott, IV
(74) *Attorney, Agent, or Firm* — Leydig, Voit & Mayer, Ltd.

(57) ABSTRACT

A modulation method, a demodulation method, and a communication apparatus are provided which relate to the field of communication technologies. The communication apparatus may obtain information bit sequences, divide the information bit sequences into G groups, then separately encode each group of information bit sequences to obtain r encoded bit sequences, map the r encoded bit sequences into a modulation symbol sequence, and output the modulation symbol sequence. The modulation method provided in
(Continued)

embodiments of this application may implement a flexible compromise between complexity and robustness, and has a wider range of application.

20 Claims, 6 Drawing Sheets

(58) Field of Classification Search
CPC ..... H04L 27/366; H04L 27/38; H04L 1/0043; H04L 1/0057; H04L 1/0068; H04L 27/0012; H04L 27/00
See application file for complete search history.

(56) References Cited

U.S. PATENT DOCUMENTS

| | | | | | |
|---|---|---|---|---|---|
| 2015/0091743 | A1 * | 4/2015 | Whikehart | .............. | H03M 5/00 |
| | | | | | 341/61 |
| 2019/0044544 | A1 * | 2/2019 | Liao | ...................... | H04L 1/0057 |
| 2019/0312676 | A1 * | 10/2019 | Jeong | .................. | H03M 13/134 |
| 2020/0028727 | A1 * | 1/2020 | Chen | ................... | H04L 27/0014 |
| 2020/0382139 | A1 * | 12/2020 | Yoffe | .................. | H04L 27/3405 |
| 2021/0314089 | A1 * | 10/2021 | Wu | ................... | H03M 13/1102 |
| 2022/0286225 | A1 * | 9/2022 | Liang | .................... | H04L 1/0065 |
| 2024/0039777 | A1 * | 2/2024 | Meng | ................... | H04L 1/0067 |
| 2024/0214256 | A1 * | 6/2024 | Wu | ....................... | H04L 27/362 |

OTHER PUBLICATIONS

"Polar Codes with Integrated Probabilistic Shaping for 5G New Radio"; Iscan et al.; 2018 IEEE 88th Vehicular Technology Conference (VTC-Fall); Apr. 2019 (Year: 2019).*

"Probabilistically Shaped Rate-Adaptive Polar-Coded 256-QAM WDM Optical Transmission System"; Iqbal et al.; Journal of Lightwave Technology, vol. 38, No. 7, Apr. 1, 2020 (Year: 2020).*

Arikan et al., "Channel Polarization: A method for constructing capacity-achieving codes," 2008 IEEE International Symposium on Information Theory, Toronto, ON, Canada, ISIT 2008, Total 5 pages (Jul. 2008).

Tal et al., "How to Construct Polar Codes," IEE Transactions on Information Theory, vol. 59, No. 10, Total 21 pages (Oct. 2013).

He et al., "Beta-Expansion: A Theoretical Framework for Fast and Recursive Construction of Polar Codes," GLOBECOM 2017-2017 IEEE Global Communications Conference, Total 6 pages (Dec. 2017).

* cited by examiner

<u>100</u>

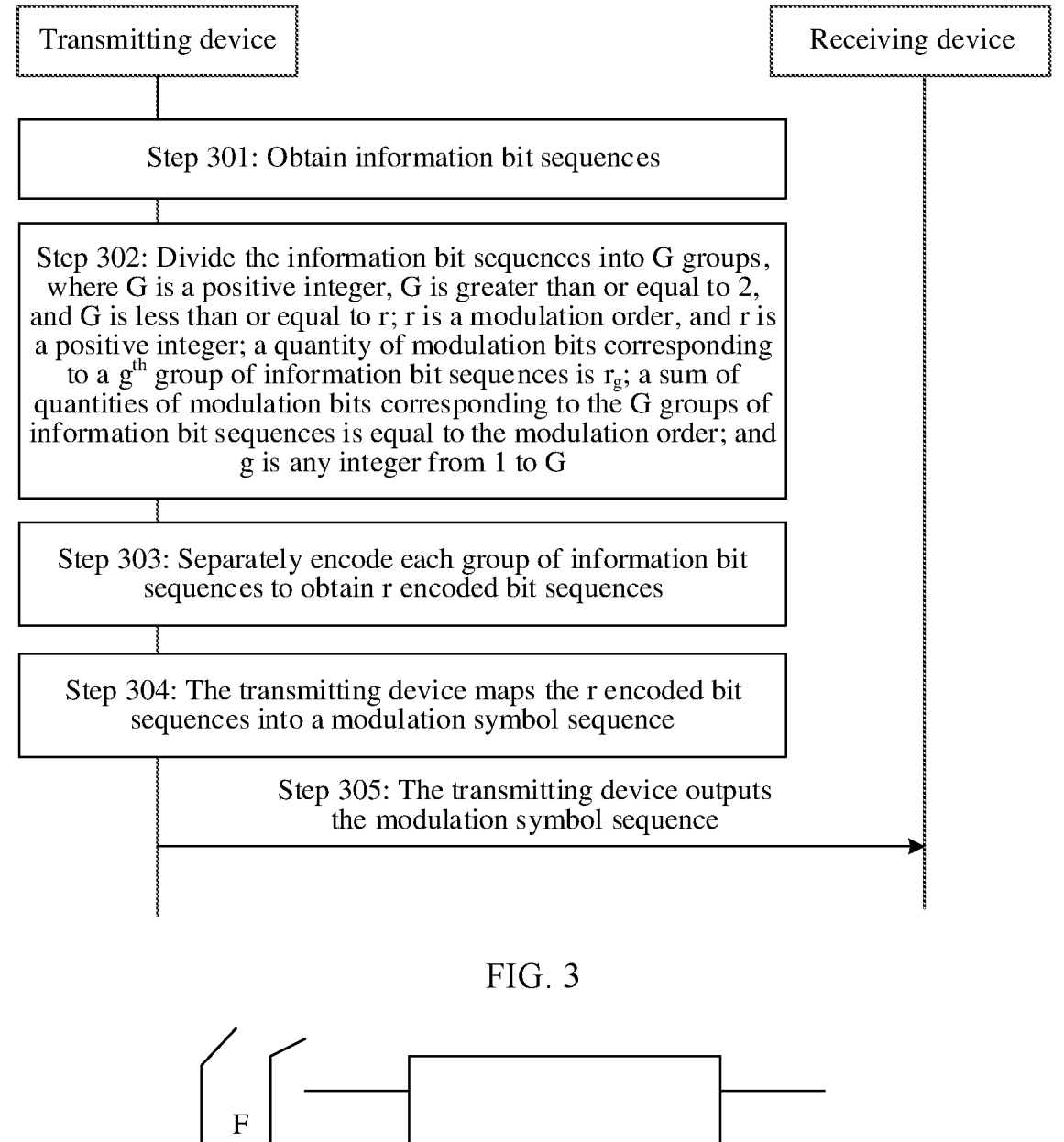

| Transmitting device | | Receiving device |

Step 301: Obtain information bit sequences

Step 302: Divide the information bit sequences into G groups, where G is a positive integer, G is greater than or equal to 2, and G is less than or equal to r; r is a modulation order, and r is a positive integer; a quantity of modulation bits corresponding to a $g^{th}$ group of information bit sequences is $r_g$; a sum of quantities of modulation bits corresponding to the G groups of information bit sequences is equal to the modulation order; and g is any integer from 1 to G Step 303: Separately encode each group of information bit sequences to obtain r encoded bit sequences Step 304: The transmitting device maps the r encoded bit sequences into a modulation symbol sequence Step 305: The transmitting device outputs the modulation symbol sequence

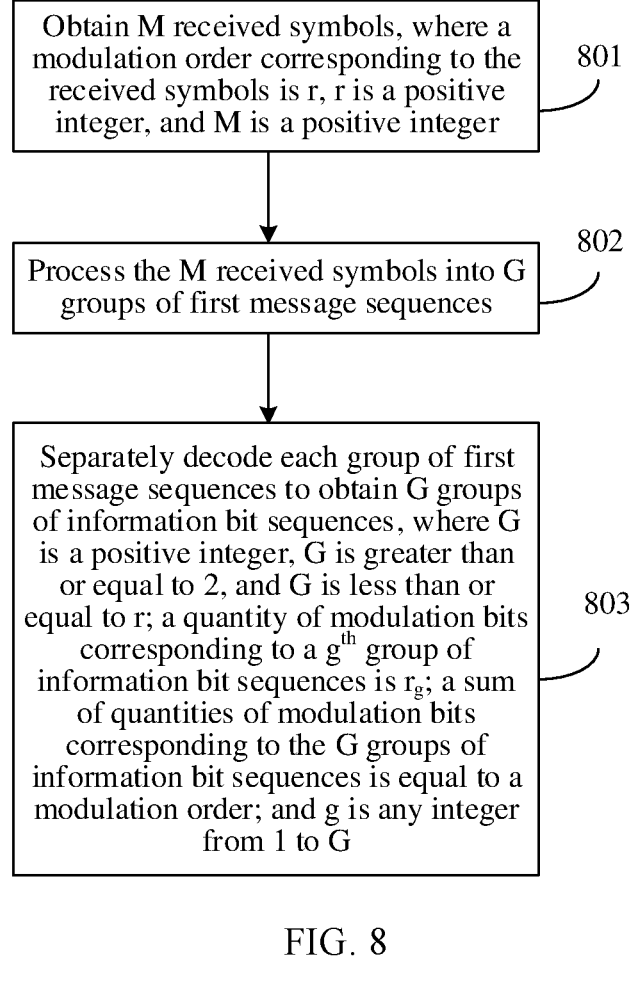

Obtain M received symbols, where a modulation order corresponding to the received symbols is r, r is a positive integer, and M is a positive integer

801

Process the M received symbols into G groups of first message sequences

802

Separately decode each group of first message sequences to obtain G groups of information bit sequences, where G is a positive integer, G is greater than or equal to 2, and G is less than or equal to r; a quantity of modulation bits corresponding to a $g^{th}$ group of information bit sequences is $r_g$; a sum of quantities of modulation bits corresponding to the G groups of information bit sequences is equal to a modulation order; and g is any integer from 1 to G

Input/Output unit 902

Processing unit 901

FIG. 9

MODULATION METHOD, DEMODULATION METHOD, AND COMMUNICATION APPARATUS

CROSS-REFERENCE TO RELATED APPLICATIONS

This application is a continuation of International Patent Application No. PCT/CN2022/085635, filed on Apr. 7, 2022, which claims priorities to Chinese Patent Application No. 202110414085.8, filed on Apr. 16, 2021 and Chinese Patent Application No. 202110669959.4, filed on Jun. 17, 2021. All of the aforementioned patent applications are hereby incorporated by reference in their entireties.

TECHNICAL FIELD

Embodiments of this application relate to the field of communication technologies, and in particular, to a modulation method, a demodulation method, and a communication apparatus.

BACKGROUND

In recent years, as a polar code is included in the 5th generation (5G) wireless communication standard, designing a polar code modulation solution becomes a hot topic in communication research. The high-order modulation technology means mapping a plurality of codeword bits to a same modulation symbol. This manner can further improve spectral efficiency. For example, 16 quadrature amplitude modulation (QAM) maps four bits to one modulation symbol, and 64 QAM maps six bits to one modulation symbol. In high-order modulation, different modulation symbols correspond to different energy. Transmitting more low-energy modulation symbols and less high-energy modulation symbols can save average energy. For a Gaussian white noise channel, when distribution of transmitted modulation symbols complies with Gaussian distribution, an amount of information transmitted per unit energy is the greatest.

To make the transmitted modulation symbols comply with Gaussian distribution, probabilistic shaping technologies are introduced (to be specific, constellation distribution remains unchanged, a probability of constellation points is adjusted, a probability of a channel symbol with low energy is set to a higher value, and a probability of a channel symbol with high energy is set to a lower value). Currently, common probabilistic shaping technologies mainly include probability amplitude shaping (PAS) and a polar shaping solution based on a successive cancellation (SC) decoder. However, the PAS does not support a non-systematic code, and the polar shaping solution based on the SC decoder does not support even-order modulation and has a characteristic of low robustness.

SUMMARY

This application provides a modulation method, a demodulation method, and a communication apparatus, to adapt to a requirement for modulation with more orders, reduce modulation complexity, and improve robustness.

According to a first aspect, an embodiment of this application provides a modulation method. The method may be performed by a communication apparatus, for example, a terminal device, an access network device, or an internet of things device, which may be understood as a module (for example, a chip) in a network device, or may be understood as a module (for example, a chip) in a terminal device. This application herein does not limit an execution body. Provided that a transmitter is disposed in a communication device, the modulation method provided in this application may be performed. The following provides descriptions by using an example in which the communication apparatus is a transmitting device.

The transmitting device may obtain information bit sequences; divide the information bit sequences into G groups, where G is a positive integer, G is greater than or equal to 2, and G is less than or equal to r; and r is a modulation order, and r is a positive integer, a quantity of modulation bits corresponding to a $g^{th}$ group of information bit sequences is $r_g$, a sum of quantities of modulation bits corresponding to the G groups of information bit sequences is equal to the modulation order, and g is any integer from 1 to G (including 1 and G); separately encode each group of information bit sequences to obtain r encoded bit sequences; map the r encoded bit sequences into a modulation symbol sequence; and output the modulation symbol sequence.

It should be noted that the modulation method provided in this application may be suitable for amplitude-shift keying (ASK) modulation, or may be applicable to QAM modulation. This is not limited in this application. For example, in 64QAM high-order modulation, the modulation order r is 3 ($r=\log_2(\sqrt{64})=3$). When the modulation method provided in this application is used, the information bit sequences may be divided into two or three groups. If the information bit sequences are divided into two groups, a quantity of modulation bits corresponding to one group is 1 bit, and a quantity of modulation bits corresponding to the other group is 2 bits. If the information bit sequences are divided into three groups, a quantity of modulation bits corresponding to each group is 1 bit. Separately encoding (for example, performing polar encoding, interleaving, rate matching, and serial-to-parallel conversion on) each group of information bit sequences can obtain three encoded bit sequences, and then the three encoded bit sequences are mapped into a modulation symbol sequence.

In embodiments of this application, after the information bit sequences are grouped, each group of information bit sequences is separately encoded. Compared with related technologies that directly encode the information bit sequences without grouping, this can adapt to a requirement for more modulation orders, improve robustness of a communication system, and reduce complexity of modulation.

In an optional implementation, when a modulation scheme is ASK, a length of the encoded bit sequence is M, or when the modulation scheme is QAM, a length of the encoded bit sequence is 2M, where M is a quantity of modulation symbols corresponding to the information bit sequences, and M is a positive integer.

It should be noted that, because a constellation diagram of ASK includes only constellation points of a real part, and a constellation diagram of QAM includes constellation points of a real part and an imaginary part, when modulation is performed by using a same method, a length of the encoded bit sequence of the QAM is twice a length of the encoded bit sequence of the ASK.

In an optional implementation, when the modulation scheme is ASK, the transmitting device may perform polar encoding on the $g^{th}$ group of information bit sequences, to obtain an encoded bit subsequence with a length of $M*r_g$, or may perform polar encoding on other groups of information bit sequences, to obtain G groups of encoded bit subsequences. Then, the transmitting device separately performs interleaving, rate matching, and serial-to-parallel conversion on G groups of encoded bit subsequences to obtain r encoded bit sequences with a length of M.

In an optional implementation, when the modulation scheme is QAM, the transmitting device may perform polar encoding on the $g^{th}$ group of information bit sequences, to obtain an encoded bit subsequence with a length of $2M*r_g$, or may perform polar encoding on other groups of information bit sequences, to obtain G groups of encoded bit subsequences. Then, the transmitting device separately performs interleaving, rate matching, and serial-to-parallel conversion on G groups of encoded bit subsequences to obtain r encoded bit sequences with a length of 2M.

It should be noted that an execution order of interleaving, rate matching, and serial-to-parallel conversion is not limited, and may be adjusted with reference to different modulation requirements, or even some steps may be skipped. For example, if a length of an encoded bit sequence is $2^a$, because rate matching is set for an encoded bit sequence that does not meet a mother code length (that is, a sequence length=$2^a$), a step of rate matching may not be performed during encoding.

In an optional implementation, when g is G, $r_G$=1, to be specific, a quantity of modulation bits corresponding to a last group is 1.

In an optional implementation, the transmitting device may determine the G groups of encoded bit subsequences in the following manner:

performing polar encoding on a $Y^{th}$ group of information bit sequences, to determine a $Y^{th}$ group of encoded bit subsequences, where Y is any integer from 1 to (G–1) (including 1 and G–1); determining a position and a value of a shaping bit; and performing polar encoding on the $G^{th}$ group of information bit sequences based on the position and the value of the shaping bit, to determine a $G^{th}$ group of encoded bit subsequences.

It should be noted that, in actual application, in the solution mentioned in this application, the last group of information bit sequences may be set as a shaping group, or another one group or more groups of information bit sequences may be set as a shaping group. For the shaping group, a position and a value of a shaping bit need to be determined, and polar encoding is performed based on the position and the value of the shaping bit, to determine an encoded bit subsequence. Polar encoding can be performed on another group other than the shaping group in the G groups of information bit sequences, provided that positions and values of an information bit and a frozen bit are determined. Using a same encoding rule or different encoding rules for different groups of information bit sequences can improve encoding efficiency, and the obtained encoded bit subsequences are more reliable.

In an optional implementation, when the modulation scheme is ASK, the transmitting device may determine the shaping bit in the following manner:

mapping (G–1) groups of encoded bit subsequences and a group of preset bit sequence into a symbol sequence, where the preset bit sequence is an all-zero bit sequence with a length of M; and determining the value of the shaping bit based on the symbol sequence.

In an optional implementation, when the modulation scheme is QAM, the transmitting device may determine the shaping bit in the following manner:

mapping (G–1) groups of encoded bit subsequences and a group of preset bit sequence into a symbol sequence, where the preset bit sequence is an all-zero bit sequence with a length of 2M, and determining the value of the shaping bit based on the symbol sequence.

It should be noted that, in this application, when the value of the shaping bit is determined, an encoding status of another group other than the shaping group is considered, so that the shaping group can be compatible with information about the another group, and encoding reliability is higher.

In an optional implementation, when the modulation scheme is ASK, the transmitting device may cyclically perform the following steps M times until a modulation symbol sequence including M modulation symbols is obtained:

selecting one bit from the r encoded bit sequences and mapping the bit into one modulation symbol according to a preset mapping rule.

In an optional implementation, when the modulation scheme is QAM, the transmitting device may cyclically perform the following steps M times until a modulation symbol sequence including M modulation symbols is obtained:

selecting one bit from the r encoded bit sequences and mapping the bit into one first symbol according to a preset mapping rule;

selecting one bit from the r encoded bit sequences and mapping the bit into one second symbol according to the preset mapping rule; and using the first symbol as a real part of a modulation symbol, and using the second symbol as an imaginary part of the modulation symbol, to obtain one modulation symbol.

It should be noted that, when QAM modulation is used, the length of the encoded bit sequence is 2M, and the transmitting device may cyclically perform M times, select two bits each time, map one bit into a first symbol and the other bit into a second symbol, use the first symbol as a real part of the modulation symbol, and use the second symbol as an imaginary part of the modulation symbol, to obtain one modulation symbol. The length of the encoded bit sequence is 2M, and the bits may be mapped into a first symbol and a second symbol in sequence. For example, a first bit is mapped into the first symbol, a second bit is mapped into the second symbol, and the first symbol into which the first bit is mapped and the second symbol into which the second bit is mapped are respectively used as a real part and an imaginary part of one modulation symbol, to obtain a $1^{st}$ modulation symbol. A third bit is mapped into the first symbol, a fourth bit is mapped into the second symbol, and the first symbol into which the first bit is mapped and the second symbol into which the second bit is mapped are respectively used as a real part and an imaginary part of one modulation symbol, to obtain a $2^{nd}$ modulation symbol. Details are not described herein. Alternatively, the first to $M^{th}$ bits are sequentially mapped into the first symbol, and an $(M+1)^{th}$ to $(2M)^{th}$ bits are mapped into the second symbol. For example, the first bit is mapped into the first symbol, the $(M+1)^{th}$ bit is mapped into the second symbol, and the first symbol into which the first bit is mapped and the second symbol into which the $(M+1)^{th}$ bit is mapped are respectively used as a real part and an imaginary part of one modulation symbol, to obtain a $1^{st}$ modulation symbol. Details are not described herein. Alternatively, another manner may be used. For example, the third bit is mapped into the first symbol, the first bit is mapped into the second symbol, and the first symbol into which the third bit is mapped and the second symbol into which the first bit is mapped are respectively used as a real part and an imaginary part of one modulation symbol, to obtain a $1^{st}$ modulation symbol. A manner of mapping the encoded bit sequence into the modulation symbol is not limited herein in this application.

In an optional implementation, the preset mapping rule is: a rule of mapping a same group of encoded bit sequences into the modulation symbol is a first rule, and a rule of mapping different groups of encoded bit sequences into the modulation symbol is a second rule.

In an optional implementation, the first rule is a Gray mapping criterion.

In an optional implementation, the second rule is a natural mapping criterion.

According to a second aspect, an embodiment of this application provides a demodulation method. The method may be performed by a communication apparatus, for example, a terminal device, an access network device, or an internet of things device, which may be understood as a module (for example, a chip) in a network device, or may be understood as a module (for example, a chip) in a terminal device. This application herein does not limit an execution body. Provided that a receiver is disposed in a communication device, the modulation method provided in this application may be performed. The following provides descriptions by using an example in which the communication apparatus is a receiving device.

The receiving device may obtain M received symbols, where a modulation order corresponding to the received symbols is r, r is a positive integer, and M is a positive integer; process the M received symbols into G groups of first message sequences; and separately decode the first message sequences to obtain G groups of information bit sequences, where G is a positive integer, G is greater than or equal to 2, and G is less than or equal to r; a quantity of modulation bits corresponding to a $g^{th}$ group of information bit sequences is $r_g$; a sum of quantities of modulation bits corresponding to the G groups of information bit sequences is equal to a modulation order; and g is from 1 to G (including 1 and G).

It should be noted that the message sequence may be a log likelihood ratio (LLR) or a hard decision result. Because the transmitting device introduces a shaping bit during modulation, spectral efficiency can be improved and energy overheads can be reduced. Correspondingly, the receiving device can reduce receiving complexity.

In an optional embodiment, the receiving device may determine a $g^{th}$ group of first message sequences based on decoding results of a $1^{st}$ to $(g-1)^{th}$ groups and prior probabilities of the $g^{th}$ to $G^{th}$ groups, where the prior probabilities of the $g^{th}$ to $G^{th}$ groups are as follows: If an $X^{th}$ group is a shaping group, a prior probability conforms to non-uniform distribution; or if an $X^{th}$ group is a non-shaping group, the prior probability conforms to uniform distribution, and the $X^{th}$ group is any group in the $g^{th}$ to $G^{th}$ groups.

In an optional implementation, the receiving device may perform parallel-to-serial conversion, rate de-matching, and de-interleaving on the first message sequences to obtain G groups of second message sequences, where a length of each group of second message sequences is $M*r_g$; and separately perform polar decoding on each group of second message sequences to obtain the G groups of information bit sequences.

According to a third aspect, an embodiment of this application provides a communication apparatus, including a processing unit and an input/output unit.

The input/output unit is configured to obtain information bit sequences. The processing unit is configured to divide the information bit sequences into G groups, where G is a positive integer, G is greater than or equal to 2, and G is less than or equal to r; and r is a modulation order, r is a positive integer, a quantity of modulation bits corresponding to a $g^{th}$ group of information bit sequences is $r_g$, a sum of quantities of modulation bits corresponding to the G groups of information bit sequences is equal to the modulation order, and g is any integer from 1 to G (including 1 and G); separately encode each group of information bit sequences to obtain r encoded bit sequences; and map the r encoded bit sequences into a modulation symbol sequence. The input/output unit is configured to output the modulation symbol sequence.

In an optional implementation, when a modulation scheme is ASK, a length of the encoded bit sequence is M, or when the modulation scheme is QAM, a length of the encoded bit sequence is 2M, where M is a quantity of modulation symbols corresponding to the information bit sequences, and M is a positive integer.

In an optional implementation, the processing unit is configured to: when the modulation scheme is ASK, perform polar encoding on the $g^{th}$ group of information bit sequences, to obtain an encoded bit subsequence with a length of $M*r_g$; and separately perform interleaving, rate matching, and serial-to-parallel conversion on G groups of encoded bit subsequences to obtain r encoded bit sequences with a length of M.

In an optional implementation, the processing unit is configured to: when the modulation scheme is QAM, perform polar encoding on the $g^{th}$ group of information bit sequences, to obtain an encoded bit subsequence with a length of $2M*r_g$; and separately perform interleaving, rate matching, and serial-to-parallel conversion on G groups of encoded bit subsequences to obtain r encoded bit sequences with a length of 2M.

In an optional implementation, when g is G, $r_G=1$.

In an optional implementation, the processing unit is configured to: perform polar encoding on a $Y^{th}$ group of information bit sequences, to determine a $Y^{th}$ group of encoded bit subsequences, where Y is any integer from 1 to (G−1) (including 1 and G−1); determine a position and a value of a shaping bit; and perform polar encoding on the $G^{th}$ group of information bit sequences based on the position and the value of the shaping bit, to determine a $G^{th}$ group of encoded bit subsequences.

In an optional implementation, the processing unit is further configured to: when the modulation scheme is ASK, map (G−1) groups of encoded bit subsequences and one group of preset bit sequence into a symbol sequence, where the preset bit sequence is an all-zero bit sequence with a length of M; and determine the value of the shaping bit based on the symbol sequence.

In an optional implementation, the processing unit is further configured to: when the modulation scheme is QAM, map (G−1) groups of encoded bit subsequences and one group of preset bit sequence into a symbol sequence, where the preset bit sequence is an all-zero bit sequence with a length of 2M; and determine the value of the shaping bit based on the symbol sequence.

In an optional implementation, when the modulation scheme is ASK, the processing unit is configured to cyclically perform the following steps M times until a modulation symbol sequence including M modulation symbols is obtained:

selecting one bit from the r encoded bit sequences and mapping the bit into one modulation symbol according to a preset mapping rule.

In an optional implementation, when the modulation scheme is QAM, the processing unit is configured to cyclically perform the following steps M times until a modulation symbol sequence including M modulation symbols is obtained:

selecting one bit from the r encoded bit sequences and mapping the bit into one first symbol according to a preset mapping rule;

selecting one bit from the r encoded bit sequences and mapping the bit into one second symbol according to the preset mapping rule; and using the first symbol as a real part of a modulation symbol, and the second symbol as an imaginary part of the modulation symbol, to obtain one modulation symbol.

In an optional implementation, the preset mapping rule is: a rule of mapping a same group of encoded bit sequences into a modulation symbol is a first rule, and a rule of mapping different groups of encoded bit sequences into a modulation symbol is a second rule.

In an optional implementation, the first rule is a Gray mapping criterion.

In an optional implementation, the second rule is a natural mapping criterion.

According to a fourth aspect, an embodiment of this application provides a communication apparatus, including an input/output unit and a processing unit.

The input/output unit is configured to obtain M received symbols, where a modulation order corresponding to the received symbols is r; r is a positive integer; and M is a positive integer. The processing unit is configured to process the M received symbols into G groups of first message sequences; and separately decode the first message sequence to obtain G groups of information bit sequences, where G is a positive integer, G is greater than or equal to 2, and G is less than or equal to r; a quantity of modulation bits corresponding to a $g^{th}$ group of information bit sequences is $r_g$; a sum of quantities of modulation bits corresponding to the G groups of information bit sequences is equal to a modulation order; and g is any integer from 1 to G (including 1 and G).

In an optional implementation, the processing unit is configured to determine a $g^{th}$ group of first message sequences based on decoding results of a $1^{st}$ to $(g-1)^{th}$ groups and prior probabilities of the $g^{th}$ to $G^{th}$ groups, where the prior probabilities of the $g^{th}$ to $G^{th}$ groups are as follows: If an $X^{th}$ group is a shaping group, the prior probability conforms to non-uniform distribution; or if an $X^{th}$ group is a non-shaping group, the prior probability conforms to uniform distribution, and the $X^{th}$ group is any group in the $g^{th}$ to $G^{th}$ groups.

In an optional implementation, the processing unit is configured to perform parallel-to-serial conversion, rate de-matching, and de-interleaving on the first message sequences to obtain G groups of second message sequences, where a length of each group of second message sequences is $M*r_g$; and separately perform polar decoding on each group of second message sequences to obtain the G groups of information bit sequences.

For the third aspect or the fourth aspect, it should be understood that the input/output unit may be referred to as a transceiver unit, a communication unit, or the like. When the communication apparatus is a terminal device, the input/output unit may be a transceiver, and the processing unit may be a processor. When the communication apparatus is a module (for example, a chip) in a terminal device, the input/output unit may be an input/output interface, an input/output circuit, an input/output pin, or the like, and may also be referred to as an interface, a communication interface, an interface circuit, or the like. The processing unit may be a processor, a processing circuit, a logic circuit, or the like.

According to a fifth aspect, this application provides a communication apparatus, including at least one processor and a memory. The memory is configured to store a computer program or instructions. When the apparatus runs, the processor executes the computer program or the instructions stored in the memory, so that the communication apparatus performs the method according to the first aspect or the embodiments of the first aspect or the method according to the second aspect or the embodiments of the second aspect.

In an optional implementation, the processor and the memory may be integrated into a same chip, or may be respectively integrated into different chips.

According to a sixth aspect, an embodiment of this application further provides a computer-readable storage medium. The computer-readable storage medium stores computer-readable instructions, and when the computer-readable instructions are run on a computer, the computer is enabled to perform the method according to any one of the first aspect or the possible designs of the first aspect, or the method according to any one of the second aspect or the possible designs of the second aspect.

According to a seventh aspect, this application provides a computer program product including instructions. When the computer program product runs on a computer, the computer is enabled to perform the method in the first aspect or the embodiments of the first aspect, or the method according to any one of the second aspect or the possible designs of the second aspect.

According to an eighth aspect, an embodiment of this application provides a chip system. The chip system includes a processor, or may further include a memory, configured to implement the method according to any one of the first aspect or the possible designs of the first aspect, or the method according to any one of the second aspect or the possible designs of the second aspect. The chip system may include a chip, or may include a chip and another discrete component.

According to a ninth aspect, an embodiment of this application provides a communication system, where the system includes a transmitting device and a receiving device, and the communication system is configured to perform the method according to any one of the first aspect or the possible designs of the first aspect, or the method according to any one of the second aspect or the possible designs of the second aspect.

For technical effects that can be achieved in the second aspect to the ninth aspect, refer to descriptions of technical effects that can be achieved in corresponding possible design solutions in the first aspect. Details are not described herein again in this application.

BRIEF DESCRIPTION OF DRAWINGS

FIG. 3 is a schematic flowchart of a modulation method according to an embodiment of this application;

FIG. 4 is a schematic diagram of polar encoding according to an embodiment of this application;

FIG. 8 is a schematic flowchart of a demodulation method according to an embodiment of this application;

FIG. 9 is a schematic diagram of a structure of a communication apparatus according to an embodiment of this application;

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, the meaning of "a plurality of" is two or more. Therefore, for implementation of the apparatus and the method, reference may be made to each other, and repeated parts are not described again.

The communication method provided in embodiments of this application may be applied to a 5G communication system or various future communication systems. For example, three most typical communication scenarios of a 5G communication system are enhanced mobile broadband (eMBB), massive machine type communication (mMTC), and ultra-reliable low-latency communication (URLLC).

Figure 1:
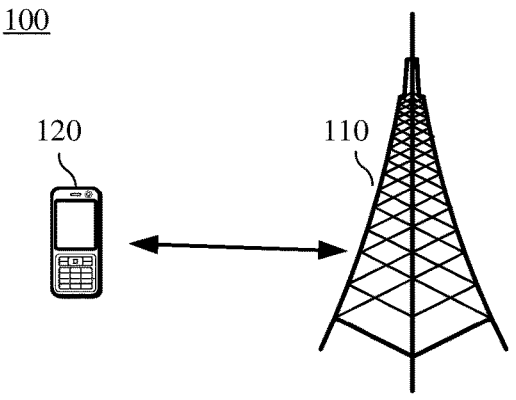
FIG. 1 is a schematic diagram of a communication system according to an embodiment of this application.

As shown in FIG. 1, embodiments of this application may be applied to a communication system 100, including an access network device 110 and a terminal device 120. When the access network device 110 is a transmitting end, the terminal device 120 is a receiving end. When the terminal device 120 is a transmitting end, the access network device 110 is a receiving end. The transmitting end may also be referred to as a modulation device, and the receiving end may also be referred to as a demodulation device. The access network device may be a base station, or may be a device after integrating the base station with the base station controller, or may be another device having similar communication functions.

The access network device 110 is a device having a wireless transceiving function or a chip that can be disposed in the device. The device includes but is not limited to: an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), an access point (AP) in a wireless fidelity (Wi-Fi) system, a radio relay node, a wireless backhaul node, a transmission point (TP, or a transmission reception point (TRP)), or may be a gNB in a 5G (for example, new radio (NR)) system, or a transmission point (TRP or TP), or one antenna panel or a group of (including a plurality of antenna panels) antenna panels of a base station in the 5G system, or may be a network node that forms a 5G base station (gNodeB, gNB) or a transmission point, for example, a baseband unit (BBU), or a distributed unit (DU), a satellite, or the like.

In some deployments, the gNB may include a central unit (CU) and a DU. The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information about the RRC layer is finally changed to information about the PHY layer (that is, sent by using the PHY layer), or is converted from information about the PHY layer. Therefore, in this architecture, high-level signaling, for example, RRC-layer signaling or PDCP-layer signaling, may also be considered to be sent by the DU, or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device may also be referred to as user equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The terminal in embodiments of this application may be a mobile phone, a tablet computer (Pad), a computer with a wireless transceiving function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, an unmanned aerial vehicle, or a wearable device, wireless terminals in a smart city and a smart home, and the like. An application scenario is not limited in embodiments of this application. In this application, a terminal having a wireless transceiving function and a chip that can be disposed in the foregoing terminal are collectively referred to as a terminal.

In the descriptions of embodiments of this application, "and/or" describes an association relationship between associated objects and represents that three relationships may exist. For example, A and/or B may represent the following three cases: only A exists, both A and B exist, and only B exists. A character "/" generally indicates an "or" relationship between the associated objects. In this application, at least one means one or more, and a plurality of means two or more. In addition, it should be understood that, in the descriptions of this application, the terms "first" and "second" are only used to distinguish the purpose of the description, but cannot be understood as indication or implication of relative importance, and cannot be understood as an indication or implication of a sequence.

Figure 2:
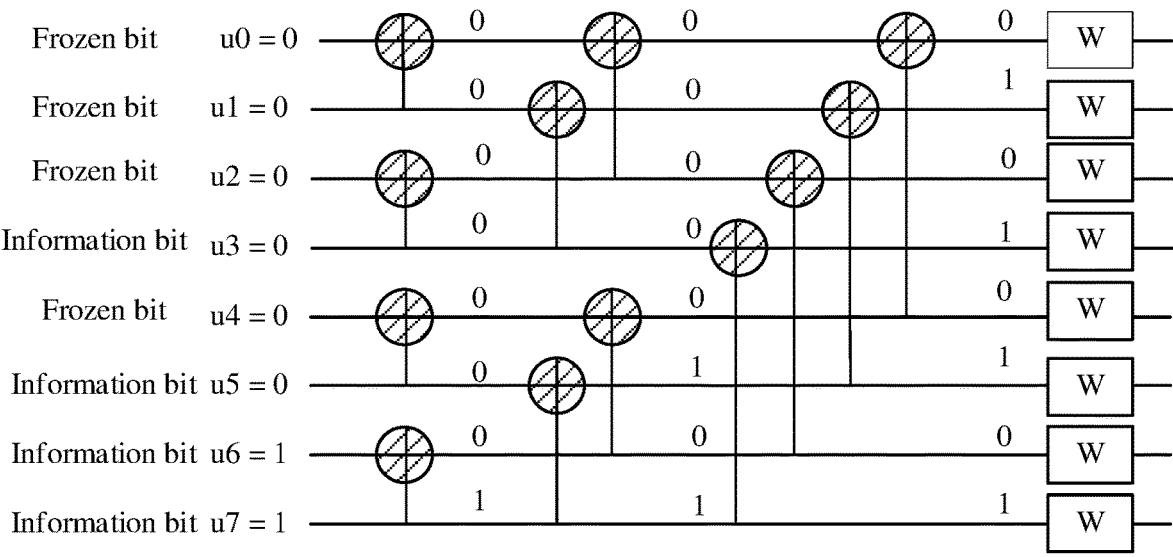
FIG. 2 is a schematic diagram of polar encoding according to an embodiment of this application.

Refer to FIG. 2. A polar code encoding process is shown, where $u_7$, $u_6$, $u_5$, and $u_3$ are information bits (data), and $u_4$, $u_2$, $u_1$, and $u_0$ are frozen bits. In actual application, a transmitting end and a receiving end may agree upon that a value of frozen is 0. Values of bits of $u_0$ and $u_1$ shown in FIG. 2 are still 0 after an exclusive or XOR operation is performed, an encoded sequence 01010101 is obtained after an operation is performed on the information bits and the frozen bits, and the encoded sequence is mapped into a modulation symbol, so that transmission may be performed on a channel W.

Polar code decoding may be implemented through polar code timing decoding. Polar code timing decoding may be understood as that a decoder performs decoding bit by bit based on natural timing of a polar design. Currently, main polar code timing decoding algorithms include SC decoding, successive cancellation list (SCL) decoding, cyclic redundancy check (CRC) aided successive cancellation list (CA-SCL) decoding, and the like.

The following describes a modulation method provided in embodiments of this application with reference to FIG. 3. The method may be performed by a communication apparatus, for example, a terminal device, an access network device, or an Internet of Things device, which may be understood as a module (for example, a chip) in a network device, or may be understood as a module (for example, a chip) in a terminal device. This application herein does not limit an execution body. Provided that a transmitter is disposed in the communication device, the modulation method provided in this application may be performed. The following provides descriptions by using an example in which the communication apparatus is a transmitting device. In FIG. 3, that the transmitting device transmits a modulation symbol to a receiving device is used as an example. However, in actual application, there is no limitation to whom the transmitting device transmits the modulation symbol to. For specific execution, refer to the following steps.

Step 301: The transmitting device obtains information bit sequences.

It should be noted that the information bit sequence is an information bit sequence that needs to be used for communication between different devices. The sequence may be from a device that is in a communication connection (a wired connection and/or a wireless connection) to the transmitting device, and may be used for indicating user information, or may be used for indicating signaling information. A source of the information bit sequence is not limited in this application.

In addition, a length of the information bit sequence in this application is not limited. Usually, the information bit sequence is a binary sequence. For example, an information bit sequence with a length of 8 is 00110101. A form of the information bit sequence is not limited herein in this application.

Step 302: The transmitting device divides the information bit sequences into G groups, where G is a positive integer, G is greater than or equal to 2, and G is less than or equal to r; and r is a modulation order, r is a positive integer, a quantity of modulation bits corresponding to a $g^{th}$ group of information bit sequences is $r_g$, a sum of quantities of modulation bits corresponding to the G groups of information bit sequences is equal to a modulation order, and g is any integer from 1 to G (including 1 and G).

It should be noted that the modulation method may be suitable for ASK modulation, or may be suitable for QAM modulation. This is not limited in this application. For example, for 8ASK high-order modulation, a modulation order r is 3($r=\log_2 8=3$). When the modulation method provided in this application is used, G may be two or three. If the information bit sequences are divided into two groups, a quantity of modulation bits corresponding to one group is 1 bit, and a quantity of modulation bits corresponding to the other group is 2 bits. If the information bit sequences are divided into three groups, a quantity of modulation bits corresponding to each group is 1 bit. This is merely an example for description, and is not limited herein. For 64QAM high-order modulation, a modulation order r is 3($r=\log_2(\sqrt{64})=3$). When the modulation method provided in this application is used, G may be two or three. If the information bit sequences are divided into two groups, a quantity of modulation bits corresponding to one group is 1 bit, and a quantity of modulation bits corresponding to the other group is 2 bits. If the information bit sequences are divided into three groups, a quantity of modulation bits corresponding to each group is 1 bit. This is merely an example for description, and is not limited herein.

In addition, a length of each group of information bit sequences may be the same or different. For example, a length of the information bit sequence is 123, and the information bit sequences are divided into two groups, where a length of a group of information bit sequences may be 23, and a length of the other group of information bit sequences may be 100; or a length of a group of information bit sequences is 43, and a length of the other group of information bit sequences is 80. A specific length of each group of information bit sequences may be set based on user requirements, or may be set according to a preset rule. For example, it is determined according to a density evolution algorithm (refer to document 1—I. Tal and A. Vardy, "How to Construct Polar Codes", in *IEEE Transactions on Information Theory*, vol. 59, no. 10, pp. 6562-6582, October 2013, doi: 10.1109/TIT.2013.2272694), or in an offline sequence indication manner (refer to document 2—G. He et al., "Beta-Expansion: A Theoretical Framework for Fast and Recursive Construction of Polar Codes", GLOBECOM 2017—2017 IEEE Global Communications Conference, Singapore, 2017, pp. 1-6, doi: 10.1109/GLO-COM.2017.8254146), or may be determined based on a sequence indication. How to determine a length of each group of the information bit sequences is not limited herein in this application.

Step 303: The transmitting device separately encodes each group of the information bit sequences to obtain the r encoded bit sequences.

Following the foregoing example, the transmitting device may separately encode (for example, perform polar encoding, interleaving, rate matching, and serial-to-parallel conversion on) each group of the information bit sequences to obtain three encoded bit sequences.

In an optional implementation, when a modulation scheme is ASK, a length of the encoded bit sequence is M, or when the modulation scheme is QAM, a length of the encoded bit sequence is 2M, where the M is a quantity of modulation symbols corresponding to the information bit sequence, and the M is a positive integer. It should be noted that, because a constellation diagram of ASK includes only constellation points of a real part, and a constellation diagram of QAM includes constellation points of a real part and an imaginary part, when modulation is performed by using a same method, a length of the encoded bit sequence of the QAM is twice a length of the encoded bit sequence of the ASK.

In an optional implementation, when the modulation scheme is ASK, the transmitting device may perform polar encoding on the $g^{th}$ group of information bit sequences, to obtain an encoded bit subsequence with a length of $M*r_g$, or may perform polar encoding on other groups of information bit sequences, to obtain G groups of encoded bit subsequences. Interleaving, rate matching, and serial-to-parallel conversion are separately performed on the G groups of encoded bit subsequences to obtain r encoded bit sequences with a length of M.

In an optional implementation, when the modulation scheme is QAM, the transmitting device may perform polar encoding on the $g^{th}$ group of information bit sequences, to obtain an encoded bit subsequence with a length of $2M^*r_g$, or may perform polar encoding on other groups of information bit sequences, to obtain G groups of encoded bit subsequences. Then, the transmitting device separately performs interleaving, rate matching, and serial-to-parallel conversion on G groups of encoded bit subsequences to obtain r encoded bit sequences with a length of 2M.

It should be further noted that an execution order of interleaving, rate matching, and serial-to-parallel conversion in this application is not limited, and may be adjusted with reference to different modulation requirements, or even some steps are not performed. For example, if a length of an encoded bit sequence is $2^a$, a step of rate matching is not performed during encoding (because rate matching is set for an encoded bit sequence that does not meet a mother code length). Polar encoding may be performed after positions and values of information bits and frozen bits are determined, as shown in FIG. 2. However, during actual execution, polar encoding may be performed in different cases. QAM modulation is used as an example, as follows:

Case 1: Conventional Polar Encoding

It is assumed that there are qi information bits, the transmitting device may use remaining $2M^*r_g$–qi bits as frozen bits, and a value of the frozen bits is 0, and encoding is performed according to a polar encoding method as shown in FIG. 2 to obtain each group of encoded subsequences.

Case 2: Polar Encoding of Cyclic Redundancy Check (CRC)

It is assumed that CRC encoding is performed on the qi information bits to obtain (qi+Li) bits, where Li is a length of CRC, $(NM_i–q_i–L_i)$ frozen bits are set to 0, and encoding is performed according to the polar encoding method as shown in FIG. 2 to obtain each group of encoded subsequences. Certainly, some other check codes may be further added without a loss of generality, and in this application, Li is used to represent a total quantity of all check encoded bits.

Case 3: Polar Encoding Optimized by Rate Matching

If a length of $2M^*r_g$ does not meet a mother code length requirement, encoding may be optimized in a rate matching manner, and the rate matching may be implemented in a puncturing manner, a preset freezing manner, or the like. It is assumed that the length of $2M^*r_g$=6, and the mother code length requirement is not met. For example, if the mother code length is 8, 6 bits may be selected in the rate matching manner as encoded bits for outputting. The rate matching manner may be the puncturing manner or the freezing manner. Puncturing means that two of 8 encoded bits are directly removed to obtain an encoded bit with a length of 6. For example, an encoded bit with a length of 8 is 1 0 1 1 0 0 1 1, and the first two positions are punctured to obtain 1 1 0 0 1 1. The freezing manner means that some positions of the encoded bit sequence become fixed bits by optimizing an encoding structure. For example, if the last two positions of the polar code with a length of 8 are set as frozen bits, the last two positions of the encoded bits are also 0. In this way, the last two bits may not need to be sent. For example, the encoded bit sequence is 1 0 1 1 0 1 0 0, and the last two bits are frozen to obtain an encoded bit sequence 1 0 1 1 0 1 with a length of 6.

Interleaving can resist channel fading and improve transmission performance. For example, 1 0 0 0 is obtained from a sequence 0 0 1 0 through interleaving. Serial-to-parallel conversion may be understood as that transmission of a sequence is converted from serial transmission to parallel transmission. For example, serial-to-parallel conversion is performed on the sequence 0 0 1 0, to obtain [0 1; 0 0], to be specific, 0 1 is output first, and then 0 0 is output.

Step 304: The transmitting device maps the r encoded bit sequences into a modulation symbol sequence.

Step 305: The transmitting device outputs the modulation symbol sequence. That the transmitting device outputs the modulation symbol sequence may be understood as transmitting or sending the M modulation symbols to a target device. In FIG. 3, the target device is a receiving device. However, in actual application, which device is the target device is not limited.

In embodiments of this application, after the information bit sequences are grouped, each group of information bit sequences is separately encoded. Compared with related technologies that directly encode the information bit sequences without grouping, this can adapt to a requirement for more modulation orders, improve robustness of a communication system, and reduce complexity of modulation.

To make the performance of the modulation symbol obtained by the transmitting device better, a shaping group may be set. During polar encoding, in addition to the information bit and the frozen bit mentioned above, a shaping bit is further introduced. The shaping bit may be obtained based on the information bit. For specific execution, refer to an SC decoding algorithm (the SC decoding algorithm is a conventional algorithm in the field of polar codes, and for details, refer to document 3—E. Arikan, "Channel polarization: A method for constructing capacity-achieving codes", 2008 IEEE International Symposium on Information Theory, Toronto, ON, Canada, 2008, pp. 1173-1177, doi: 10.1109/ISIT.2008.4595172). FIG. 4 is a schematic diagram of resolving a shaping bit. It is assumed that a maximum likelihood ratio LLR on a right side of an SC decoder is a known value, and both the information bit and the frozen bit are used as known parameters (for example, both the information bit and the frozen bit are used as frozen bits), a value of the shaping bit may be resolved. In FIG. 4, F is the information bit, I is the frozen bit, and S is the shaping bit. During calculation, the information bit and the frozen bit are used as known values F', and the shaping bit is calculated based on the LLR.

In an optional implementation, when g is G, $r_G$=1, that is, a quantity of modulation bits corresponding to the last group is 1, that is, the last group is set as a shaping group. However, in actual application of the modulation method, a plurality of groups may be set as a shaping group. This is not limited in this application, and only the last group is used as the shaping group for description herein.

When the modulation method includes the shaping group, the transmitting device may determine G groups of encoded bit subsequences in the following manner.

performing polar encoding on a $Y^{th}$ group of information bit sequences, to determine a $Y^{th}$ group of encoded bit subsequences, where Y is any integer from 1 to (G–1) (including 1 and G–1) (that is, polar encoding may be performed on a non-shaping group according to the foregoing three cases).

For the $G^{th}$ group, a position and a value of the shaping bit need to be determined, and polar encoding is performed on the $G^{th}$ group of information bit sequences based on the position and the value of the shaping bit, to determine a $G^{th}$ group of encoded bit subsequences.

Using a same encoding rule or different encoding rules for different groups of information bit sequences can improve encoding efficiency, and the obtained encoded bit subsequences are more reliable.

When the shaping bit is introduced into bit interleaved coded modulation (BICM), the shaping bit in the BICM may resolve the position and value of the shaping bit by using an all −1 vector as the LLR of the decoder in FIG. 4. However, this manner of calculating the shaping bit only supports calculation of even-order modulation, and has low flexibility. In addition, when a shaping bit is introduced in multi-level coding (MLC), a symbol sequence obtained by encoding and mapping a sequence which is not provided with a shaping bit may be used as an LLR of the decoder in FIG. 4 to resolve a position and a value of the shaping bit. However, in this manner, not only each information bit sequence needs to be separately encoded, but also information bits need to be frequently adjusted through rate matching, and the robustness is poor. In consideration of the foregoing case, in this application, to adapt to requirements of different modulation orders and reduce robustness, when information bit sequences are grouped, different encoding policies are used for shaping groups and non-shaping groups, and when a shaping bit in the shaping group is resolved, a symbol sequence mapped after the non-shaping group is encoded is fully considered. In one aspect, more modulation orders can be supported, and in another aspect, the encoding robustness can be reduced.

During execution, when a modulation scheme is ASK, the (G−1) groups of encoded bit subsequences and a group of preset bit sequence may be mapped into a symbol sequence, where the preset bit sequence is an all-zero bit sequence with a length of M, and a value of the shaping bit is determined based on the symbol sequence. For example, (G−1) groups of bit sequences and a group of all-zero bit sequences are mapped into a symbol sequence x2 (a length is M), $2^{m-1}$ is subtracted from each element in x2 to obtain a result, and the result is used as an LLR. km information bits are placed in corresponding information bit positions, the frozen bits are set to 0, and a shaping bit is used as to-be-solved information for decoding, to obtain the position and the value of the shaping bit. When the modulation scheme is QAM, the transmitting device may map (G−1) groups of encoded bit subsequences and a group of preset bit sequence into a symbol sequence, where the preset bit sequence is an all-zero bit sequence with a length of 2M; and determine the value of the shaping bit based on the symbol sequence. For example, the (G−1) groups of bit sequences and a group of all-zero bit sequence are mapped into the symbol sequence x2 (a length of 2M), $2^{m-1}$ is subtracted from each element in x2 to obtain a result, and the result is used as the LLR. km information bits are placed in corresponding information bit positions, the frozen bits are set to 0, and a shaping bit is used as to-be-solved information for decoding, to obtain the position and the value of the shaping bit.

It should be noted that, in this application, when a shaping bit is determined, an encoding status of another group other than the shaping group is considered, so that the shaping group can be compatible with information about the another group, and encoding reliability is higher.

In step 304, when the modulation scheme is ASK, the transmitting device may separately select one bit from the r encoded bit sequences and map the bit into one modulation symbol according to a preset mapping rule, and after the mapping is performed cyclically M times, the modulation symbol sequence including M modulation symbols may be obtained.

When the modulation scheme is QAM, the transmitting device may select one bit from the r encoded bit sequences and map the bit to one first symbol according to the preset mapping rule, select one bit from the r encoded bit sequences and map the bit into one second symbol according to the preset mapping rule, and use a first symbol as a real part of the modulation symbol, and a second symbol as an imaginary part of the modulation symbol, to obtain one modulation symbol. After M times of cyclic execution, a modulation symbol sequence including M modulation symbols may be obtained.

It should be noted that, when QAM modulation is used, the length of the encoded bit sequence is 2M, and the transmitting device may cyclically perform M times, select two bits each time, map one bit into a first symbol and the other bit into a second symbol, use the first symbol as a real part of the modulation symbol, and use the second symbol as an imaginary part of the modulation symbol, to obtain one modulation symbol. The length of the encoded bit sequence is 2M, and the bits may be mapped into a first symbol and a second symbol in sequence. For example, a first bit is mapped into the first symbol, a second bit is mapped into the second symbol, and the first symbol into which the first bit is mapped and the second symbol into which the second bit is mapped are respectively used as a real part and an imaginary part of one modulation symbol, to obtain a $1^{st}$ modulation symbol. A third bit is mapped into the first symbol, a fourth bit is mapped into the second symbol, and the first symbol into which the first bit is mapped and the second symbol into which the second bit is mapped are respectively used as a real part and an imaginary part of one modulation symbol, to obtain a $2^{nd}$ modulation symbol. Details are not described herein. Alternatively, the first to $M^{th}$ bits are sequentially mapped into the first symbol, and an $(M+1)^{th}$ to $(2M)^{th}$ bits are mapped into the second symbol. For example, the first bit is mapped into the first symbol, the $(M+1)^{th}$ bit is mapped into the second symbol, and the first symbol into which the first bit is mapped and the second symbol into which the $(M+1)^{th}$ bit is mapped are respectively used as a real part and an imaginary part of one modulation symbol, to obtain a $1^{st}$ modulation symbol. Details are not described herein. Alternatively, another manner may be used. For example, the third bit is mapped into the first symbol, the first bit is mapped into the second symbol, and the first symbol into which the third bit is mapped and the second symbol into which the first bit is mapped are respectively used as a real part and an imaginary part of one modulation symbol, to obtain a $1^{st}$ modulation symbol. A manner of mapping the encoded bit sequence into the modulation symbol is not limited herein in this application.

When ASK modulation is used, because a length of each encoded bit sequence in the r encoded bit sequences is M, one bit may be sequentially selected from the r encoded bit sequences, and may be mapped into one modulation symbol. After M times of cyclic execution, M modulation symbols may be obtained. A specific mapping rule to be used is not limited herein in this application, and a Gray mapping criterion, a natural mapping criterion, or the like may be selected.

It should be noted that, for the encoded sequence, the modulation symbol may be obtained by referring to a comparison table or according to a preset rule. Only the comparison table is used as an example herein, as shown in Table 1. After determining the encoded bit sequence, the transmitting device may determine, with reference to Table 1, the modulation symbol corresponding to the encoded bit sequence. For example, the modulation symbol corresponding to 111 is −7. In actual application, only one or more rows may be applied. This is not limited in this application. For example, an encoded bit sequence c1 is 10011001, c2 is 11001100, and c3 is 11110000. $1^{st}$ bits of c1 to c3 are selected to obtain a bit value 111, and it can be learned by querying Table 1 that a corresponding modulation symbol is −7. $5^{th}$ bits of c1 to c3 are selected to obtain 110, and it can be learned by querying Table 1 that a corresponding modulation symbol is 1. This is merely an example for description and is not illustrated one by one.

TABLE 1

| Bit value | Modulation symbol |
| --- | --- |
| 111 | −7 |
| 011 | −5 |
| 001 | −3 |
| 101 | −1 |
| 110 | 1 |
| 010 | 3 |
| 000 | 5 |
| 100 | 7 |
| . . . | . . . |

When ASK modulation is used, the encoded bit sequence may be mapped into a modulation symbol based on a bit value with reference to Table 1. When QAM modulation is used, a case in which an imaginary part exists in a QAM constellation diagram needs to be considered with reference to Table 1, and the imaginary part also needs to perform mapping of a modulation symbol with reference to Table 1. This application is not described herein.

In an optional embodiment, a rule of mapping a same group of encoded bit sequences into a modulation symbol is a first rule, and a rule of mapping different groups of encoded bit sequences into a modulation symbol is a second rule. In this application, when a shaping group is set, a same encoding rule or different mapping rules may be used for a shaping group and a non-shaping group. This is not limited herein. The first rule may be the Gray mapping criterion, and the second rule may be the natural mapping criterion. The Gray mapping criterion in the solution applied to this application may be understood as that adjacent positions of encoded bit sequences for shaping differ by only one bit. The natural mapping criterion in the solution applied to this application may be understood as that for each group, a structure of a sub-symbol set selected based on an encoded bit sequence of a pre-order encoded group shaping does not change with an encoded bit change of the pre-order encoded group.

Figures 5, 6:
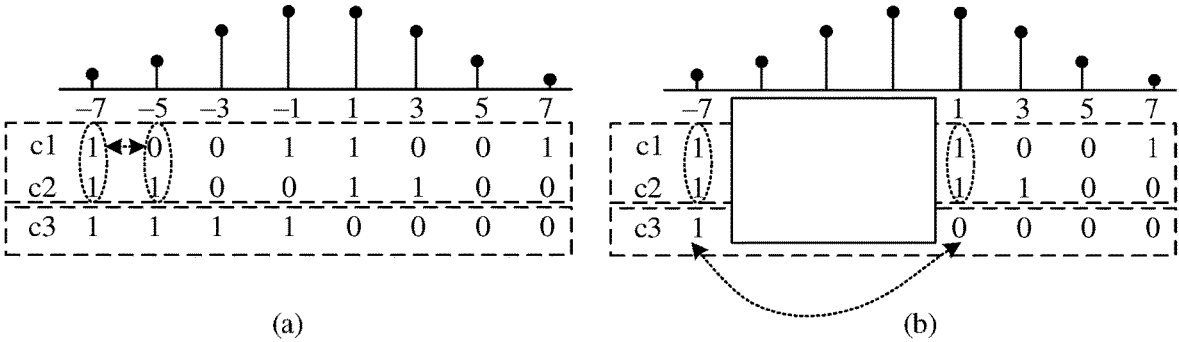
FIG. 5 is a schematic diagram of a relationship between an encoded bit sequence and a modulation symbol according to an embodiment of this application.
FIG. 6 is a schematic diagram of grouping according to an embodiment of this application.

FIG. 5 is a schematic diagram of a relationship between an encoded bit sequence and a modulation symbol. (a) in FIG. 5 shows three encoded bit sequences C1, C2, and C3, where C1 and C2 are a $1^{st}$ group, C3 is a $2^{nd}$ group, the $1^{st}$ group is a non-shaping group, and the $2^{nd}$ group is a shaping group. The encoded bit sequence is mapped into {−7, −5, −3, −1, 3, 5, 7}. Symbols −7 and −5 are adjacent symbols, −7 corresponds to {1, 1}, and −5 corresponds to {0, 1}, and only one bit is different. Therefore, it can be learned that adjacent positions of encoded bit sequences in a same group differ by only one bit. The value of C3 corresponding to the modulation symbol −7 and the value of C3 corresponding to the modulation symbol 1 as shown in (b) in FIG. 5 are also adjacent positions (because the $1^{st}$ group of sub-sequences corresponding to −7 and 1 are the same, the values are adjacent positions), and it can be learned that the adjacent positions differ by only one bit. It is assumed that modulation symbols corresponding to a symbol subset {1, 1} screened by a non-shaping group are respectively −7 and 1, and a distance between the two symbols is 8; and modulation symbols corresponding to a symbol subset {0, 1} screened by the non-shaping group are respectively −5 and 3, and a distance between the two symbols is also 8. Therefore, it can be learned that a distance between C3 and each symbol subset is the same.

The solution of this application is described below with reference to a specific embodiment. The transmitting device may modulate a same group of information bit sequences with reference to the modulation policy of BICM (when the BICM is used, all modulation bits in a high-order modulation symbol are encoded with a channel code), and may modulate different groups of information bit sequences with reference to the modulation policy of MLC (when the MLC is used, each modulation bit in a high-order modulation symbol is independently encoded with a channel code). Grouping may be performed as shown in FIG. 6. In the figure, only two groups are used for illustration. However, in actual application, the groups may be further divided into more groups, which is not illustrated herein. FIG. 6 includes two groups: BICM-1 and BICM-2. For each group of information bit sequences, encoding may be performed in a manner of polar encoding, interleaving, and serial-to-parallel conversion, to obtain an encoded bit sequence, and then different groups of encoded bit sequences are mapped into modulation symbols. It should be noted that, in this application, a quantity of bits of a modulation symbol corresponding to each group of information bit sequences may be 1, or 2, or more. Modulation is performed on a group of information bit sequences instead of separately encoding an information bit sequence corresponding to each bit. Therefore, the robustness is higher.

Figure 7:
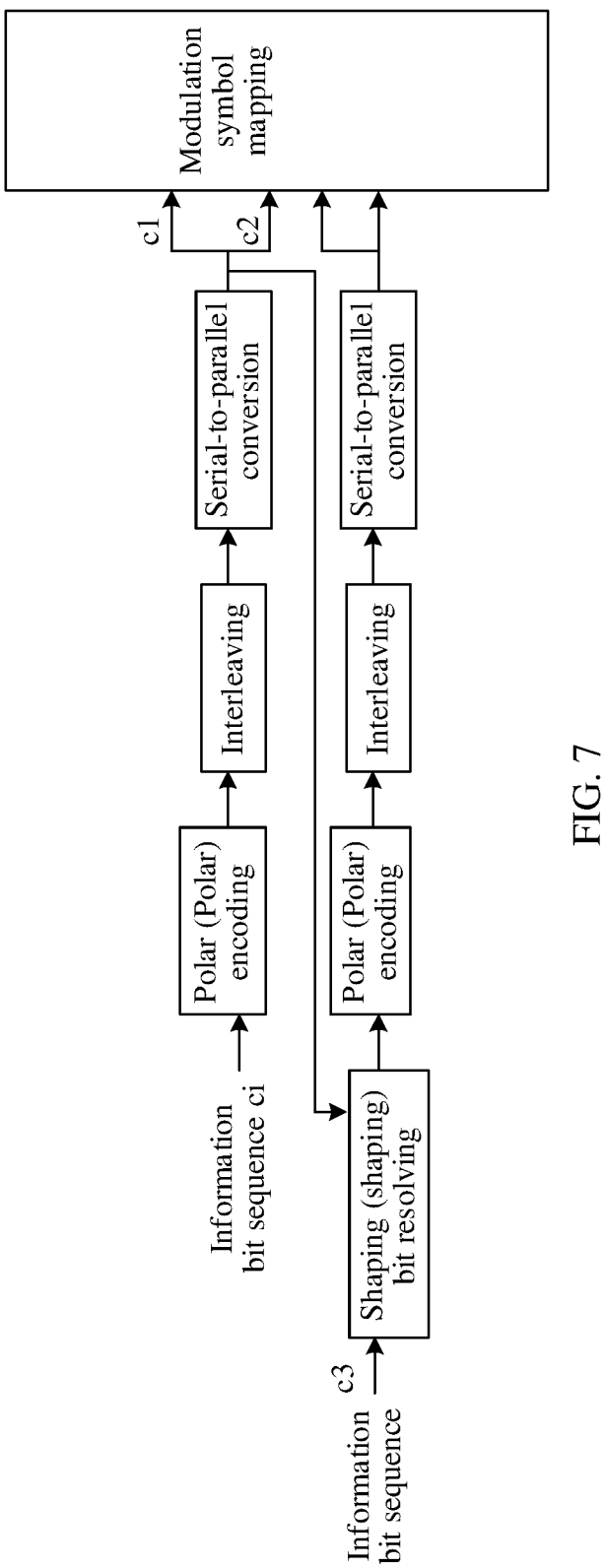
FIG. 7 is a schematic flowchart of a modulation method according to an embodiment of this application.

During packet grouping, the shaping group and the non-shaping group can be differentiated, and the modulation processing can be performed according to FIG. 7. In FIG. 7, only 8ASK modulation is used as an example for illustration. A modulation order of 8ASK is 3, and is odd-order modulation. It is assumed that an information bit sequence is {1, 0, 1, 0, 0, 0, 1, . . . , 0}, has a length of 256, and is divided into two groups, where a sequence length of TYPE1 is 241 and a sequence length of TYPE2 is 15. TYPE1 is a non-shaping group, and a corresponding quantity of modulation bits is 2. TYPE2 is a shaping group, and a corresponding quantity of modulation bits is 1. For the information bit sequence of the TYPE1, polar encoding with a length of M*2 is performed, to obtain an encoded sequence ci with a length of M*2. Interleaving is performed on the encoded sequence ci, and then serial-to-parallel conversion is performed to obtain two bit sequences C1 and C2 with a length of M. The polar encoding may be performed with reference to the foregoing three cases, which are not shown one by one herein. For the information bit sequence of the TYPE2, when polar encoding with a length of M*1 is performed, the transmitting device may map bit sequences of the TYPE1 group and a group of all-zero bit sequences to a symbol sequence x2 (the length is M), subtract $2^{m-1}$ from each element in x2 to obtain a result, and use the result as LLR; and place km information bits in corresponding information bit positions, set the frozen bits to 0, and use the shaping bits as to-be-solved information for decoding, to obtain a value of the shaping bits. Then, the shaping bits, the information bits, and the frozen bits are placed at preset positions for polar encoding, to obtain an encoded sequence C3 with a length of M. Then, C1, C2, and C3 are mapped into modulation symbols with reference to a Gray mapping criterion and a natural mapping criterion.

In embodiments of this application, after the information bit sequences are grouped, each group of information bit sequences is separately encoded. Compared with related technologies that directly encode the information bit sequences without grouping, this can adapt to a requirement for more modulation orders, improve robustness of a communication system, and reduce complexity of modulation.

Correspondingly, in a process of transmitting a modulation symbol on a channel, the transmitting device may be doped with interference such as noise. Therefore, the symbol received by the receiving device is not a regular modulation symbol. The symbol received from the transmitting device may be defined as a received symbol. Then the receiving device demodulates and decodes the received symbol to obtain an information bit sequence. During execution, refer to steps as shown in FIG. 8.

Step 801: Obtain M received symbols, where a modulation order corresponding to the received symbols is r, r is a positive integer, and M is a positive integer.

Step 802: Process the M received symbols into G groups of first message sequences. The message sequence may be an LLR or a hard decision result. This is not limited in this application.

Step 803: Separately decode the first message sequence to obtain G groups of information bit sequences, where G is a positive integer, G is greater than or equal to 2, and G is less than or equal to r; and a quantity of modulation bits corresponding to a $g^{th}$ group of information bit sequences is $r_g$; a sum of quantities of modulation bits corresponding to the G groups of information bit sequences is equal to a modulation order; and g is any integer from 1 to G (including 1 and G). In step 803, the first message sequences are processed serially.

In an optional embodiment, the $g^{th}$ group of first message sequences is determined based on decoding results of a $1^{st}$ to $(g-1)^{th}$ groups and prior probabilities of the $g^{th}$ to $G^{th}$ groups, where the prior probabilities of the $g^{th}$ to $G^{th}$ groups are as follows: If an $X^{th}$ group is a shaping group, a prior probability conforms to non-uniform distribution; or if an $X^{th}$ group is a non-shaping group, the prior probability conforms to uniform distribution, and the $X^{th}$ group is any group in the $g^{th}$ to $G^{th}$ groups.

For example, for a 2-order modulation scheme (16QAM or 4ASK), it is assumed that two groups are included during demodulation, one group is an s group, and the other group is an x1 group. A modulation mapping relationship is shown in Table 2.

TABLE 2

| | 16QAM/4ASK | | | |
|---|---|---|---|---|
| Modulation symbol x | −3 | −1 | 1 | 3 |
| x1 | 0 | 0 | 1 | 1 |
| s | 1 | 0 | 0 | 1 |

It should be noted that, y=x+n, y is a received symbol, and n is a Gaussian distribution with noise conforming to an average value of 0. For example, a transmission channel for the received symbol is additive white Gaussian noise (AWGN), or may be another channel model, for example, a fading channel. This is not limited in this application. In addition, it should be further noted that it is assumed that the s group is a shaping group, and the prior probability conforms to non-uniform distribution. A specific probability value may be determined based on a channel condition, for example, p (s=0)=0.21, p (s=1)=1−p (s=0)=0.79, and may be adjusted based on the channel condition. The x1 group is a non-shaping group, and the prior probability conforms to uniform distribution, for example, p $(x_1=0)$=p $(x_1=1)$=0.5.

The following describes, with reference to Table 2 and a specific example, a method for determining x1 groups of first message sequences by using the following formula 1. The first message sequences are shown by using an LLR.

$$LLR(x1) = \log\frac{p(x1 = 0|y)}{p(x1 = 1|y)} = \log\frac{p(x1 = 0)p(y|x1 = 0)}{p(x1 = 1)p(y|x1 = 1)} = \qquad \text{Formula 1}$$

$$\log\frac{p(x1 = 0)(p(s = 1)p(y|x = -3) + p(s = 0)p(y|x = -1))}{p(x1 = 1)(p(s = 1)p(y|x = 3) + p(s = 0)p(y|x = 1))}$$

p(x=0|y) indicates a probability of x1=0 after the receiving device receives the symbol y, that is, a posterior probability, p (x1=1|y) indicates a probability of x1=1 after the receiving device receives the symbol y, and the probability is also a posterior probability. p(y|x1=0) and p(y|x1=0) are both likelihood functions, where p(y|x1=0) indicates a distribution status of y when x1=0; and p(y|x1=1) indicates a distribution status of y when x1=1. p(x1=1) and p(x1=1) indicate a prior probability of x1.

Then, the receiving device may calculate a value of LLR(x1) by using different received symbols y, and determine the x1 groups of first message sequences based on different LLR(x1).

Determining the s groups of first message sequences is described below with reference to the following formula based on a decoding result of x1, the received symbol y, and a prior probability of s:

$$LLR(s) = \log\frac{p(s = 0|y)}{p(s = 1|y)} = \qquad \text{Formula 2}$$

$$\log\frac{p(s = 0)p(y|s = 0)}{p(s = 1)p(y|s = 1)} = \log\frac{p(s = 0)p(y|x = -1)}{p(s = 1)p(y|x = -3)}$$

In the foregoing formula 2, it is assumed that x1=0, and the LLR is calculated. When x1=1, a corresponding calculation formula may also be determined according to a calculation rule of LLR. This is not described in this application, and reference may be made to a related technology or document. p(s=0) and p(s=1) indicate a prior probability of s, and then the receiving device may calculate a value of LLR(s) by using different received symbols y, and determine the s groups of first message sequences based on different LLR(s).

In addition, it should be further noted that, after the $1^{st}$ to $(g-1)^{th}$ groups are decoded, that is, after step 803 is performed, information bit sequences corresponding to the $1^{st}$ to $(g-1)^{th}$ groups may be obtained, and the $g^{th}$ group of first message sequences is determined based on the information bit sequences corresponding to the $1^{st}$ to $(g-1)^{th}$ groups and prior probabilities of the $g^{th}$ to $G^{th}$ groups. For example, if G is 3, and g is 2, a $2^{nd}$ group of first message sequences may be determined based on the $1^{st}$ group of information bit sequences and the $2^{nd}$ and $3^{rd}$ groups of prior probabilities.

In an optional embodiment, parallel-to-serial conversion, rate de-matching, and de-interleaving are performed on the first message sequences to obtain G groups of second message sequences, and a length of each group of second message sequences is $M*r_g$. Polar decoding is separately performed on each group of second message sequences to obtain the G groups of information bit sequences.

It should be noted that, the performing parallel-to-serial conversion, rate de-matching, de-interleaving, and the like on the first message sequences may be executed with reference to an inverse process of the modulation method. Details are not described herein again.

It should be further noted that the transmitting device and the receiving device may agree in advance upon a specific quantity of groups into which the information bit sequences are divided, so that the receiving device better determines a demodulation policy. In addition, in actual application, there may be another demodulation method. All methods for demodulating a received symbol into an information bit sequence are suitable for this application, and are not illustrated one by one herein.

Based on a same concept, embodiments of this application provide a communication apparatus, as shown in FIG. 9, including a processing unit 901 and an input/output unit 902. In actual application, the input/output unit may be implemented by a same data processing chip, or may be implemented by different data processing chips. This is not limited in this application. The communication apparatus may be the foregoing transmitting device and receiving device. When the communication apparatus is the transmitting device, the input/output unit 902 may be configured to obtain information bit sequences. In actual application, the operation of obtaining the information bit sequences may be understood as a data processing operation of an input unit. The processing unit 901 may divide the information bit sequences into G groups, where G is a positive integer, G is greater than or equal to 2, and G is less than or equal to r; and r is a modulation order, r is a positive integer, a quantity of modulation bits corresponding to a $g^{th}$ group of information bit sequences is $r_g$, a sum of quantities of modulation bits corresponding to G groups of information bit sequences is equal to the modulation order, and g is any integer from 1 to G (including 1 and G); separately encode each group of information bit sequences to obtain r encoded bit sequences; and map the r encoded bit sequences into M modulation symbol sequences. The input/output unit 902 may be configured to output the modulation symbol sequences. In actual application, the operation of outputting the modulation symbol sequences may be understood as a data processing operation of an output unit.

In embodiments of this application, after the information bit sequences are grouped, each group of information bit sequences is separately encoded. Compared with related technologies that directly encode the information bit sequences without grouping, this can adapt to a requirement for more modulation orders, improve robustness of a communication system, and reduce complexity of modulation.

In an optional implementation, when the modulation scheme is ASK, a length of the encoded bit sequence is M, or when the modulation scheme is QAM, a length of the encoded bit sequence is 2M, where M is a quantity of modulation symbols corresponding to the information bit sequences, and M is a positive integer.

In an optional implementation, the processing unit 901 is configured to: when a modulation scheme is ASK, perform polar encoding on the $g^{th}$ group of information bit sequences, to obtain an encoded bit subsequence with a length of M*$r_g$; and separately perform interleaving, rate matching, and serial-to-parallel conversion on G groups of encoded bit subsequences to obtain r encoded bit sequences with a length of M.

In an optional implementation, the processing unit 901 is configured to: when a modulation scheme is QAM, perform polar encoding on the $g^{th}$ group of information bit sequences, to obtain an encoded bit subsequence with a length of 2M*$r_g$; and separately perform interleaving, rate matching, and serial-to-parallel conversion on G groups of encoded bit subsequences to obtain r encoded bit sequences with a length of 2M.

It should be noted that an execution order of interleaving, rate matching, and serial-to-parallel conversion is not limited, and may be adjusted with reference to different modulation requirements, or even some steps are not performed. For example, if a length of an information bit sequence is $2^a$, because rate matching is set for an information bit sequence that does not meet a mother code length (that is, a sequence length=2a), a step of rate matching may not be performed during encoding In an optional implementation, when g is G, $r_G$=1.

In an optional implementation, the processing unit 901 is configured to: perform polar encoding on a $Y^{th}$ group of information bit sequences, to determine a $Y^{th}$ group of encoded bit subsequences, where Y is any integer from 1 to (G−1) (including 1 and G−1); determine a position and a value of a shaping bit; and perform polar encoding on the $G^{th}$ group of information bit sequences based on the position and the value of the shaping bit, to determine a $G^{th}$ group of encoded bit subsequences.

In an optional implementation, the processing unit 901 is further configured to: when the modulation scheme is ASK, map (G−1) groups of encoded bit subsequences and one group of preset bit sequences into a symbol sequence, where the preset bit sequence is an all-zero bit sequence with a length of M; and determine the value of the shaping bit based on the symbol sequence.

It should be noted that, in actual application, in the solution mentioned in this application, the last group of information bit sequences may be set as a shaping group, or another one group or more groups of information bit sequences may be set as a shaping group. For the shaping group, a position and a value of a shaping bit need to be determined, and polar encoding is performed based on the position and the value of the shaping bit and the information bit sequence of the shaping group, to determine an encoded bit subsequence. Polar encoding can be performed on another group other than the shaping group in the G groups of information bit sequences, provided that positions and values of an information bit and a frozen bit are determined. Using a same encoding rule or different encoding rules for different groups of information bit sequences can improve encoding efficiency, and the obtained encoded bit subsequences are more reliable.

In an optional implementation, the processing unit 901 is further configured to: when the modulation scheme is ASK, map (G−1) groups of encoded bit subsequences and one group of preset bit sequences into a symbol sequence, where the preset bit sequence is an all-zero bit sequence with a length of M; and determine the value of the shaping bit based on the symbol sequence.

In an optional implementation, the processing unit 901 is further configured to: when the modulation scheme is QAM, map (G−1) groups of encoded bit subsequences and one group of preset bit sequence into a symbol sequence, where the preset bit sequence is an all-zero bit sequence with a length of 2M; and determine the value of the shaping bit based on the symbol sequence.

It should be noted that, in this application, when a shaping bit is determined, an encoding status of another group other than the shaping group is considered, so that the shaping group can be compatible with information about the another group, and encoding reliability is higher.

In an optional implementation, when the modulation scheme is ASK, the processing unit 901 is configured to cyclically perform the following steps M times until a modulation symbol sequence including M modulation symbols is obtained: separately selecting one bit from the r encoded bit sequences and mapping the bit into one modulation symbol according to a preset mapping rule.

In an optional implementation, when the modulation scheme is QAM, the processing unit 901 is configured to cyclically perform the following steps M times until a modulation symbol sequence including M modulation symbols is obtained: selecting one bit from the r encoded bit sequences and mapping the bit into one first symbol according to a preset mapping rule;

selecting one bit from the r encoded bit sequences and mapping the bit into one second symbol according to the preset mapping rule; and using the first symbol as a real part of a modulation symbol, and the second symbol as an imaginary part of the modulation symbol, to obtain one modulation symbol.

It should be noted that, when QAM modulation is used, the length of the encoded bit sequence is 2M, and the transmitting device may cyclically perform M times, select two bits each time, map one bit into a first symbol and the other bit into a second symbol, use the first symbol as a real part of the modulation symbol, and use the second symbol as an imaginary part of the modulation symbol, to obtain one modulation symbol. The length of the encoded bit sequence is 2M, and the bits may be mapped into a first symbol and a second symbol in sequence. For example, a first bit is mapped into the first symbol, a second bit is mapped into the second symbol, and the first symbol into which the first bit is mapped and the second symbol into which the second bit is mapped are respectively used as a real part and an imaginary part of one modulation symbol, to obtain a $1^{st}$ modulation symbol. A third bit is mapped into the first symbol, a fourth bit is mapped into the second symbol, and the first symbol into which the first bit is mapped and the second symbol into which the second bit is mapped are respectively used as a real part and an imaginary part of one modulation symbol, to obtain a $2^{nd}$ modulation symbol. Details are not described herein. Alternatively, the first to $M^{th}$ bits are sequentially mapped into the first symbol, and an $(M+1)^{th}$ to $(2M)^{th}$ bits are mapped into the second symbol. For example, the first bit is mapped into the first symbol, the $(M+1)^{th}$ bit is mapped into the second symbol, and the first symbol into which the first bit is mapped and the second symbol into which the $(M+1)^{th}$ bit is mapped are respectively used as a real part and an imaginary part of one modulation symbol, to obtain a $1^{st}$ modulation symbol. Details are not described herein. Alternatively, another manner may be used. For example, the third bit is mapped into the first symbol, the first bit is mapped into the second symbol, and the first symbol into which the third bit is mapped and the second symbol into which the first bit is mapped are respectively used as a real part and an imaginary part of one modulation symbol, to obtain a $1^{st}$ modulation symbol. A manner of mapping the encoded bit sequence into the modulation symbol is not limited herein in this application.

In an optional implementation, the preset mapping rule is: a rule of mapping a same group of encoded bit sequences into the modulation symbol is a first rule, and a rule of mapping different groups of encoded bit sequences into the modulation symbol is a second rule.

In an optional implementation, the first rule is a Gray mapping criterion.

In an optional implementation, the second rule is a natural mapping criterion.

When the communication apparatus is a receiving device, the input/output unit 902 is configured to obtain M received symbols, where a modulation order corresponding to the received symbols is r, r is a positive integer, and M is a positive integer. The processing unit 901 is configured to process the M received symbols into G groups of first message sequences, where r is a modulation order, and r is a positive integer; and separately decode each message sequence to obtain G groups of information bit sequences, where G is a positive integer, G is greater than or equal to 2, and G is less than or equal to r; and a quantity of modulation bits corresponding to a $g^{th}$ group of information bit sequences is $r_g$, a sum of quantities of modulation bits corresponding to the G groups of information bit sequences is equal to a modulation order, and g is any integer from 1 to G (including 1 and G).

In an optional implementation, a $g^{th}$ group of first message sequences is determined based on decoding results of a $1^{st}$ to $(g-1)^{th}$ groups and prior probabilities of the $g^{th}$ to $G^{th}$ groups, where the prior probabilities of the $g^{th}$ to $G^{th}$ groups are as follows: If an $X^{th}$ group is a shaping group, the prior probability conforms to non-uniform distribution; or if an $X^{th}$ group is a non-shaping group, the prior probability conforms to uniform distribution, and the $X^{th}$ group is any group in the $g^{th}$ to $G^{th}$ groups.

In an optional implementation, the processing unit 901 is configured to: perform parallel-to-serial conversion, rate de-matching, and de-interleaving on each first message sequence to obtain G groups of second message sequences, where a length of each group of second message sequences is $M*r_g$; and separately perform polar decoding on each group of second message sequences to obtain the G groups of information bit sequences.

It should be understood that the foregoing input/output unit may be referred to as a transceiver unit, a communication unit, or the like. When the communication apparatus is a terminal device, the input/output unit may be a transceiver, and the processing unit may be a processor. When the communication apparatus is a module (for example, a chip) in a terminal device, the input/output unit may be an input/output interface, an input/output circuit, an input/output pin, or the like, and may also be referred to as an interface, a communication interface, an interface circuit, or the like. The processing unit may be a processor, a processing circuit, a logic circuit, or the like.

Figure 10:
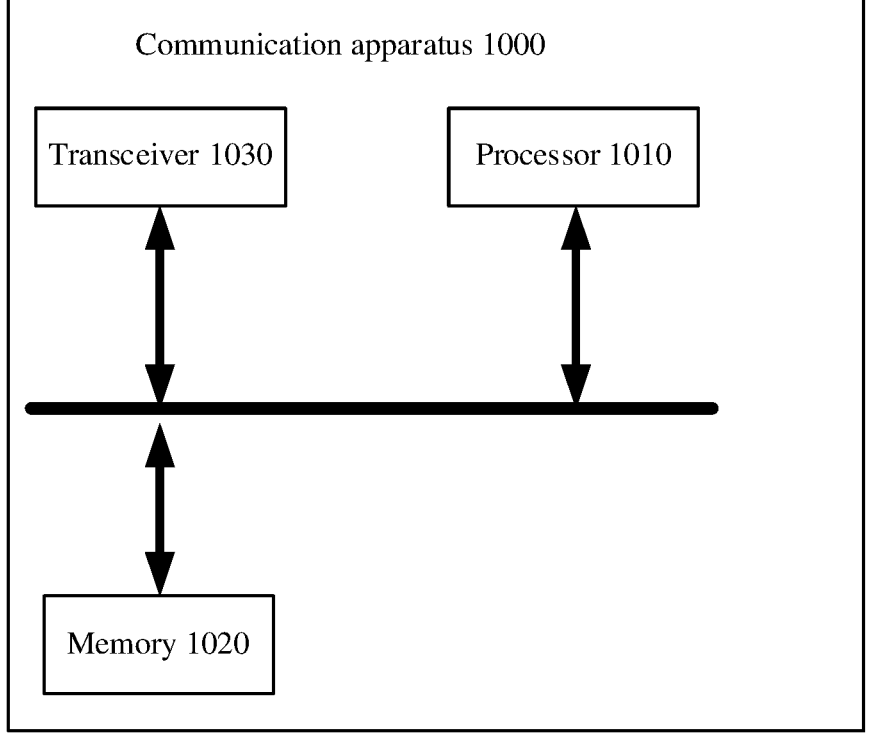
FIG. 10 is a schematic diagram of a structure of a communication apparatus according to an embodiment of this application.

In addition, as shown in FIG. 10, this application further provides a communication apparatus 1000. For example, the communication apparatus 1000 may be a chip or a chip system. Optionally, in embodiments of this application, the chip system may include a chip, or may include a chip and another discrete device.

The communication apparatus 1000 may include at least one processor 1010. The communication apparatus 1000 may further include at least one memory 1020 configured to store a computer program, program instructions, and/or data. The memory 1020 is coupled to the processor 1010. The coupling in embodiments of this application may be an indirect coupling or a communication connection between apparatuses, units, or modules in an electrical form, a mechanical form, or another form, and is used for information exchange between the apparatuses, the units, or the modules. The processor 1010 and the memory 1020 may operate cooperatively. The processor 1010 may execute the computer program stored in the memory 1020. Optionally, the at least one memory 1020 may also be integrated with the processor 1010.

The communication apparatus 1000 may further include a transceiver 1030, and the communication apparatus 1000 may perform information exchange with another device by using a transceiver 1030. The transceiver 1030 may be a circuit, a bus, a transceiver, or any other apparatus for information exchange.

In a possible implementation, the communication apparatus 1000 may be applied to the foregoing transmitting device, or may be the foregoing receiving device. The memory 1020 stores a computer program, program instructions, and/or data necessary for implementing a function of a relay device in any one of the foregoing embodiments. The processor 1010 may execute the computer program stored in the memory 1020, to complete the method in any one of the foregoing embodiments.

In embodiments of this application, a specific connection medium between the transceiver 1030, the processor 1010, and the memory 1020 is not limited. In embodiments of this application, the memory 1020, the processor 1010, and the transceiver 1030 are connected through a bus in FIG. 10. The bus is represented in a bold line in FIG. 10. A connection manner between other components is merely an example for description, and does not constitute a limitation. The bus may be classified into an address bus, a data bus, a control bus, and the like. For ease of representation, only one bold line is used to represent the bus in FIG. 10, but this does not mean that there is only one bus or only one type of buses. In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware and software modules in the processor.

In embodiments of this application, the memory may be a nonvolatile memory, for example, a hard disk drive (HDD) or a solid-state drive (SSD), or may be a volatile memory, for example, a random access memory (RAM). Alternatively, the memory may be any other medium that can be configured to carry or store expected program code in a form of instructions or a data structure and that can be accessed by a computer, but is not limited thereto. Alternatively, the memory in embodiments of this application may be a circuit or any other apparatus that can implement a storage function, and is configured to store a computer program, program instructions, and/or data.

Figure 11:
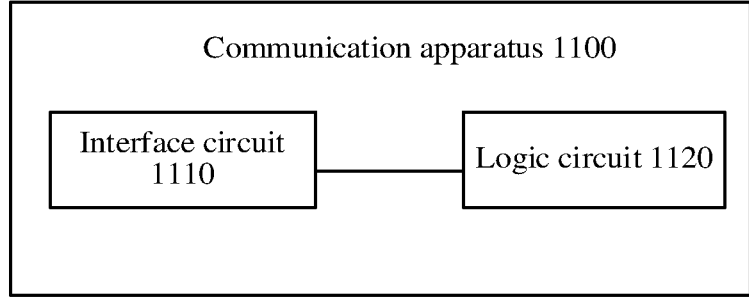
FIG. 11 is a schematic diagram of a structure of a communication apparatus according to an embodiment of this application.

Based on the foregoing embodiments, refer to FIG. 11. Embodiments of this application further provide another communication apparatus 1100, including an interface circuit 1110 and a logic circuit 1120. The interface circuit 1110 may be understood as an input/output interface, and may be configured to perform the same operation steps as those of the input/output unit as shown in FIG. 9 or the transceiver as shown in FIG. 10. Details are not described herein again in this application. The logic circuit 1120 may be configured to run code instructions to perform the method in any one of the foregoing embodiments, may be understood as the processing unit in FIG. 9 or the processor in FIG. 10, and may implement a same function as the processing unit or the processor. Details are not described herein again in this application.

Based on the foregoing embodiments, embodiments of this application further provide a readable storage medium. The readable storage medium stores instructions. When the instructions are executed, the method in any one of the foregoing embodiments is implemented. The readable storage medium may include any medium that can store program code, such as a USB flash drive, a removable hard disk, a read-only memory, a random access memory, a magnetic disk, or an optical disc.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the apparatus (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing apparatus to generate a machine, so that the instructions executed by the computer or the processor of another programmable data processing apparatus generate an apparatus for implementing a specific function in one or more procedures in the flowcharts and/or in one or more blocks in the block diagrams.

These computer program instructions may alternatively be stored in a computer-readable memory that can indicate the computer or another programmable data processing device to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

These computer program instructions may alternatively be loaded onto a computer or another programmable data processing apparatus, so that a series of operation steps are performed on the computer or another programmable apparatus, to generate computer-implemented processing. Therefore, the instructions executed on the computer or another programmable apparatus provide steps for implementing a specific function in one or more procedures in the flowcharts and/or in one or more blocks in the block diagrams.

What is claimed is:

1. A modulation method applied to an electronic device, the method comprising:

obtaining information bit sequences;

dividing the information bit sequences into G groups, wherein G is a positive integer, G is greater than or equal to 2, and G is less than or equal to r; and r is a modulation order, r is a positive integer, a quantity of modulation bits corresponding to a $g^{th}$ group of information bit sequences is $r_g$, a sum of quantities of modulation bits corresponding to the G groups of information bit sequences is equal to the modulation order, and g is any integer from 1 to G, including 1 and G;

wherein based on a modulation scheme being quadrature amplitude modulation (QAM), a length of an encoded bit sequence is 2M, wherein M is a quantity of modulation symbols corresponding to the information bit sequences, and M is a positive integer;

separately encoding each group of information bit sequences to obtain r encoded bit sequences, including:

performing polar encoding on the $g^{th}$ group of information bit sequences, to obtain an encoded bit subsequence with a length of $2M*r_g$;

separately performing interleaving, rate matching, and serial-to-parallel conversion on G groups of encoded bit subsequences to obtain the r encoded bit sequences with a length of 2M;

mapping the r encoded bit sequences into a modulation symbol sequence; and outputting the modulation symbol sequence.

2. The method according to claim 1, wherein in response to g being G, $r_G=1$.

3. The method according to claim 2, wherein the G groups of encoded bit subsequences are determined in the following manner:

performing polar encoding on a $Y^{th}$ group of information bit sequences, to determine a $Y^{th}$ group of encoded bit subsequences, wherein Y is any integer from 1 to (G−1), including 1 and (G−1);

determining a position and a value of a shaping bit; and performing polar encoding on the $G^{th}$ group of information bit sequences based on the position and the value of the shaping bit, to determine a $G^{th}$ group of encoded bit subsequences.

4. The method according to claim 3, wherein the shaping bit is determined in the following manner:

mapping (G−1) groups of encoded bit subsequences and a group of preset bit sequences into a symbol sequence, wherein the preset bit sequence is an all-zero bit sequence with a length of 2M; and determining the value of the shaping bit based on the symbol sequence.

5. The method according to claim 4, wherein based on a modulation scheme being an amplitude shift keying (ASK) modulation scheme, the all-zero bit sequence has a length of M.

6. The method according to claim 5, wherein for the ASK modulation scheme, a length of any gth group of encoded bit subsequences is M*rg.

7. The method according to claim 5, wherein for the ASK modulation scheme, a length of each encoded bit sequence among the r encoded bit sequences is M.

8. The method according to claim 1, wherein the mapping the r encoded bit sequences into the modulation symbol sequence comprises:

cyclically performing the following: M times until a modulation symbol sequence comprising M modulation symbols is obtained:

selecting one bit from the r encoded bit sequences and mapping the bit into one first symbol according to a preset mapping rule;

selecting one bit from the r encoded bit sequences and mapping the bit into one second symbol according to the preset mapping rule; and using the first symbol as a real part of a modulation symbol, and using the second symbol as an imaginary part of the modulation symbol, to obtain the modulation symbol.

9. The method according to claim 8, wherein a rule of mapping a same group of encoded bit sequences into a modulation symbol is a first rule; and a rule of mapping different groups of encoded bit sequences into a modulation symbol is a second rule.

10. The method according to claim 9, wherein the first rule is a Gray mapping criterion.

11. The method according to claim 9, wherein the second rule is a natural mapping criterion.

12. A demodulation method applied to an electronic device, the method comprising:

obtaining M received symbols, wherein a modulation order corresponding to the received symbols is r, r is a positive integer, and M is a positive integer;

processing the M received symbols into G groups of first message sequences, including:

determining a $g^{th}$ group of first message sequences based on decoding results of a $1^{st}$ to $(g-1)^{th}$ groups and prior probabilities of the $g^{th}$ to $G^{th}$ groups, wherein the prior probabilities of the $g^{th}$ to $G^{th}$ groups are as follows: based on an $X^{th}$ group being a shaping group, the prior probability conforms to non-uniform distribution; or based on an $X^{th}$ group being a non-shaping group, the prior probability conforms to uniform distribution, and the $X^{th}$ group is any group in the $g^{th}$ to $G^{th}$ groups; and separately decoding the first message sequences to obtain G groups of information bit sequences, wherein G is a positive integer, G is greater than or equal to 2, and G is less than or equal to r; a quantity of modulation bits corresponding to a $g^{th}$ group of information bit sequences is $r_g$; a sum of quantities of modulation bits corresponding to the G groups of information bit sequences is equal to the modulation order; and g is any integer from 1 to G, including 1 and G.

13. The method according to claim 12, wherein the separately decoding the first message sequences to obtain the G groups of information bit sequences comprises:

performing parallel-to-serial conversion, rate de-matching, and de-interleaving on the first message sequences to obtain G groups of second message sequences, wherein a length of each group of second message sequences is $M*r_g$; and separately performing polar decoding on each group of second message sequences to obtain the G groups of information bit sequences.

14. A communication apparatus, comprising:

at least one processor and at least one memory, wherein the at least one memory is configured to store a computer program; and the at least one processor is configured to execute the computer program stored in the memory, to enable the communication apparatus to:

obtain information bit sequences; and divide the information bit sequences into G groups, wherein G is a positive integer, G is greater than or equal to 2, and G is less than or equal to r; and r is a modulation order, r is a positive integer, a quantity of modulation bits corresponding to a $g^{th}$ group of information bit sequences is $r_g$, a sum of quantities of modulation bits corresponding to the G groups of information bit sequences is equal to the modulation order, and g is any integer from 1 to G, including 1 and G;

wherein based on a modulation scheme being quadrature amplitude modulation (QAM), a length of an encoded bit sequence is 2M, wherein M is a quantity of modulation symbols corresponding to the information bit sequences, and M is a positive integer;

separately encode each group of information bit sequences to obtain r encoded bit sequences, including:

performing polar encoding on the $g^{th}$ group of information bit sequences, to obtain an encoded bit subsequence with a length of $2M*r_g$;

separately performing interleaving, rate matching, and serial-to-parallel conversion on G groups of encoded bit subsequences to obtain the r encoded bit sequences with a length of 2M;

map the r encoded bit sequences into a modulation symbol sequence; and output the modulation symbol sequence.

15. The apparatus according to claim 14, wherein when g is G, $r_G=1$.

16. The apparatus according to claim 15, wherein the at least one processor is further configured to execute the computer program stored in the memory, to enable the communication apparatus to:

perform polar encoding on a $Y^{th}$ group of information bit sequences, to determine a $Y^{th}$ group of encoded bit subsequences, wherein Y is any integer from 1 to (G−1), including 1 and (G−1);

determine a position and a value of a shaping bit; and perform polar encoding on the $G^{th}$ group of information bit sequences based on the position and the value of the shaping bit, to determine a $G^{th}$ group of encoded bit subsequences.

17. The apparatus according to claim 16, wherein the at least one processor is further configured to execute the computer program stored in the memory, to enable the communication apparatus to:

map (G−1) groups of encoded bit subsequences and a group of preset bit sequences into a symbol sequence, wherein the preset bit sequence is an all-zero bit sequence with a length of 2M; and determine the value of the shaping bit based on the symbol sequence.

18. The apparatus according to claim 17, wherein based on a modulation scheme being an amplitude shift keying (ASK) modulation scheme, the all-zero bit sequence has a length of M.

19. The apparatus according to claim 18, wherein for the ASK modulation scheme, a length of any gth group of encoded bit subsequences is M*rg.

20. The apparatus according to claim 14, wherein the at least one processor is further configured to execute the computer program stored in the memory, to enable the communication apparatus to:

cyclically perform the following M times until a modulation symbol sequence comprising M modulation symbols is obtained:

selecting one bit from the r encoded bit sequences and mapping the bit into one first symbol according to a preset mapping rule;

selecting one bit from the r encoded bit sequences and mapping the bit into one second symbol according to the preset mapping rule; and using the first symbol as a real part of a modulation symbol, and using the second symbol as an imaginary part of the modulation symbol, to obtain one of the modulation symbols.

* * * * *